(12) United States Patent
Hausauer et al.

(10) Patent No.: US 11,648,825 B2
(45) Date of Patent: May 16, 2023

(54) SCREEN ASSEMBLY FOR CONSTRUCTION VEHICLE

(71) Applicant: Caterpillar Inc., Peoria, IL (US)

(72) Inventors: Ryan Barry Hausauer, Chillicothe, IL (US); Randall E. Davis, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 344 days.

(21) Appl. No.: 16/907,479

(22) Filed: Jun. 22, 2020

(65) Prior Publication Data
US 2021/0394591 A1  Dec. 23, 2021

(51) Int. Cl.
| | |
|---|---|
| B60H 3/06 | (2006.01) |
| B62D 33/06 | (2006.01) |
| B01D 46/00 | (2022.01) |
| B01D 46/24 | (2006.01) |
| B01D 46/62 | (2022.01) |

(52) U.S. Cl.
CPC ....... B60H 3/0641 (2013.01); B01D 46/0005 (2013.01); B01D 46/24 (2013.01); B01D 46/645 (2022.01); B62D 33/06 (2013.01); *B01D 2265/02* (2013.01); *B01D 2279/40* (2013.01); *B60H 2003/065* (2013.01)

(58) Field of Classification Search
CPC ............ B60H 3/0641; B60H 2003/065; B60H 3/0616; B60H 1/00; B60H 1/378; B60H 1/00378; B60H 2001/00235; B01D 46/645; B01D 46/0005; B01D 46/24; B01D 2265/02; B01D 2279/40; B62D 33/06; B62D 33/0617

USPC ....................................................... 55/385.3
See application file for complete search history.

(56) References Cited

U.S. PATENT DOCUMENTS

| | | | | |
|---|---|---|---|---|
| 3,537,240 | A * | 11/1970 | Sturm ..................... | B64D 33/02 55/306 |
| 3,844,202 | A * | 10/1974 | Ferguson ........... | B60H 1/00378 55/385.3 |
| 4,366,878 | A * | 1/1983 | Warf ...................... | B60K 13/02 55/385.3 |
| 9,701,178 | B2 | 7/2017 | Williams et al. | |
| 10,214,079 | B2 | 2/2019 | Hasan et al. | |
| 2002/0069624 | A1* | 6/2002 | Jaramillo ............... | B01D 46/10 55/497 |
| 2006/0254228 | A1* | 11/2006 | Moktader .............. | F02M 25/12 55/418 |
| 2014/0150384 | A1* | 6/2014 | Bunnell ............. | F02M 35/0216 55/385.3 |

FOREIGN PATENT DOCUMENTS

EP  1199199  12/2003

* cited by examiner

*Primary Examiner* — Robert A Hopkins
*Assistant Examiner* — Qianping He
(74) *Attorney, Agent, or Firm* — Harrity & Harrity, LLP (57) ABSTRACT

A screen assembly adapted to be removably coupled to an air filter of a construction vehicle includes a frame member including a first portion and a second portion. The screen assembly includes a screen member coupled to the frame member such that a hollow space is defined by the screen member and the frame member. The screen member includes a plurality of perforations adapted to allow passage of air therethrough. The plurality of perforations are further adapted to restrict an ingress of debris into the hollow space of the screen assembly.

20 Claims, 5 Drawing Sheets

SCREEN ASSEMBLY FOR CONSTRUCTION VEHICLE

TECHNICAL FIELD

The present disclosure relates to a screen assembly for a construction vehicle, and more particularly to the screen assembly removably coupled to an air filter of the construction vehicle.

BACKGROUND

A construction vehicle, such as a track type construction vehicle, includes an air filter that is installed to remove foreign particles, such as dust, pollen, mold, bacteria, and the like from air passing through the air filter. Air filters are used in applications where air quality is vital, notably in vehicle air treatment/ventilation systems or in engines of the construction vehicle. The air filter can affect an air conditioning and heating performance of the construction vehicle. The air filter is typically placed proximate an operator cabin of the construction vehicle.

Further, the construction vehicle may be used in various applications, such as in forestry applications. In such applications, debris, such as ember or wood particles, may be present in a vicinity of the construction vehicle. Such debris may enter the air filter along with air and, in some situations, burn or damage the air filter. For example, the debris may damage a filtering element disposed in the air filter. Further, if the filtering element gets damaged, the debris may enter the operator cabin of the construction vehicle, which is not desirable. For example, such inadvertent intrusion of the debris (particularly embers) may lead to fire hazards.

U.S. Pat. No. 9,701,178 describes an apparatus and a method for a cabin air filter to remove airborne molecular contaminants and volatile organic compounds from a passenger compartment of a vehicle. The cabin air filter includes a supportive frame configured to suitably orient the cabin air filter within a ventilation system of the vehicle. The supportive frame has a shape and size suitable for supporting the cabin air filter within the ventilation system. A filter medium is retained within the supportive frame and configured to remove the airborne molecular contaminants and volatile organic compounds from air flowing through the ventilation system. The filter medium electrostatically attracts and agglomerates contaminants within the air flowing through the air filter.

SUMMARY OF THE DISCLOSURE

In an aspect of the present disclosure, a screen assembly adapted to be removably coupled to an air filter of a construction vehicle is provided. The screen assembly includes a frame member including a first portion and a second portion. The screen assembly also includes a screen member coupled to the frame member such that a hollow space is defined by the screen member and the frame member. The screen member includes a plurality of perforations are adapted to allow passage of air therethrough. The plurality of perforations are further adapted to restrict an ingress of debris into the hollow space of the screen assembly.

In another aspect of the present disclosure, a construction vehicle is provided. The construction vehicle includes a frame. The construction vehicle also includes an operator cabin supported by the frame. The construction vehicle further includes an air filter assembly adapted to be coupled proximate the operator cabin. The air filter assembly includes an air filter defining a central axis. Further, the air filter includes an inlet portion. The air filter assembly also includes a screen assembly adapted to be removably coupled to the air filter. The screen assembly includes a frame member including a first portion and a second portion. The screen assembly also includes a screen member coupled to the frame member such that a hollow space is defined by the screen member and the frame member. The screen member includes a plurality of perforations adapted to allow passage of air therethrough. The plurality of perforations are further adapted to restrict an ingress of debris into the hollow space of the screen assembly.

Other features and aspects of this disclosure will be apparent from the following description and the accompanying drawings.

DETAILED DESCRIPTION

Reference numerals appearing in more than one figure indicate the same or corresponding parts in each of them. References to elements in the singular may also be construed to relate to the plural and vice-versa without limiting the scope of the disclosure to the exact number or type of such elements unless set forth explicitly in the appended claims.

Figure 1:
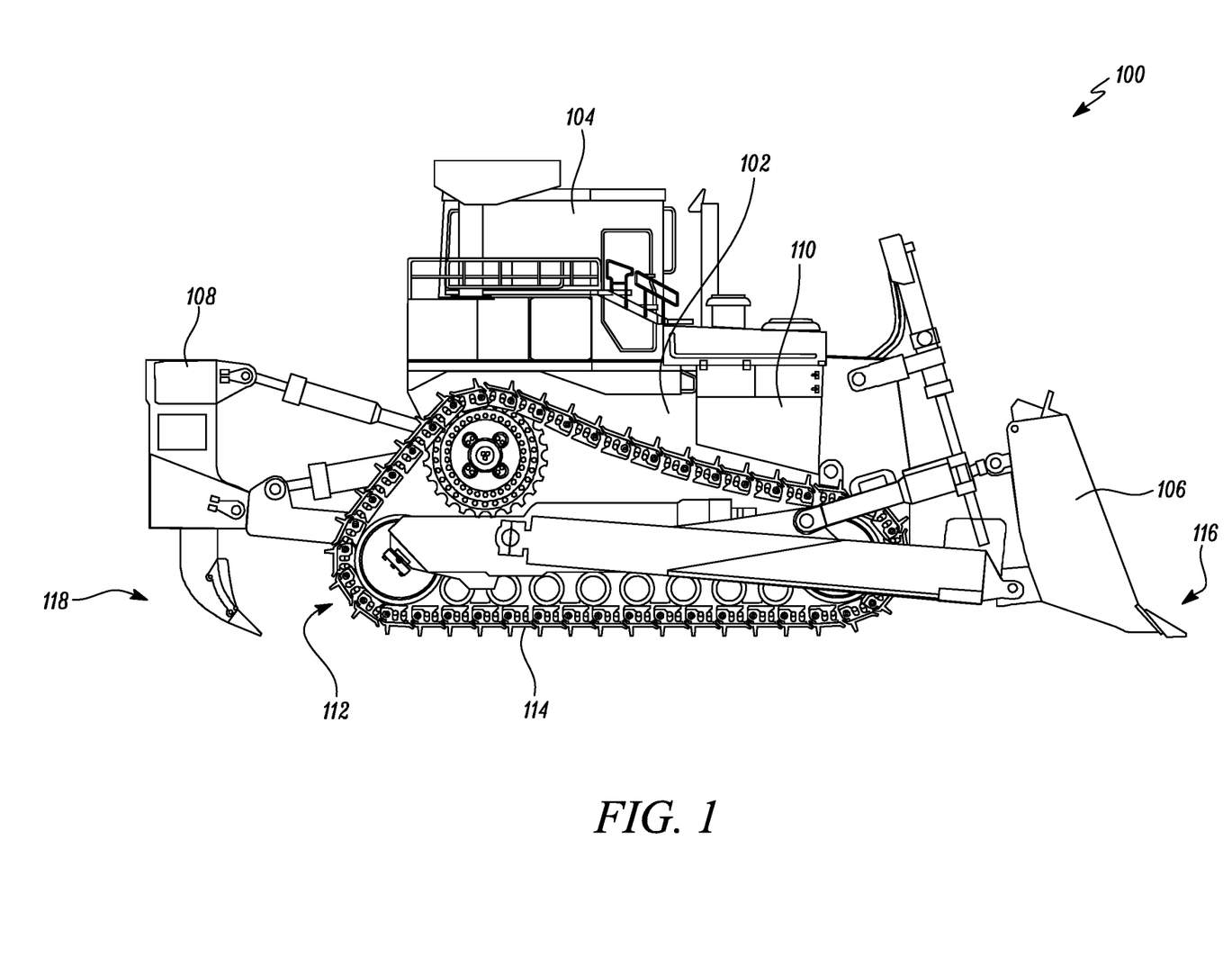
FIG. 1 is a schematic side view of a construction vehicle, according to an embodiment of the present disclosure.

FIG. 1 is a side view of a construction vehicle 100, according to an embodiment of the present disclosure. In the illustrated embodiment, the construction vehicle 100 is embodied as a track type tractor. In alternative embodiments, the construction vehicle 100 may include an excavator, a dozer, a harvester, or any other type of construction vehicle known in the art. The construction vehicle 100 may perform one or more operations associated with an industry such as mining, construction, forestry, farming, transportation, or any other industry known in the art. The construction vehicle 100 may be embodied as a manual, autonomous, or semi-autonomous construction vehicle, without any limitations.

The construction vehicle 100 includes a frame 102 that supports various components of the construction vehicle 100 thereon. The construction vehicle 100 also includes an operator cabin 104 supported by the frame 102. When the construction vehicle 100 is embodied as a manual or semi-autonomous construction vehicle, an operator of the construction vehicle 100 is seated within the operator cabin 104 to perform one or more operations. The construction vehicle 100 also includes a work implement 106 disposed at a front portion 116 of the construction vehicle 100. The work implement 106 is embodied as a blade herein. Further, the construction vehicle 100 additionally includes another work implement 108, embodied as a ripper, disposed at a rear portion 118 of the construction vehicle 100.

The construction vehicle 100 also includes a power source (not shown), such as an engine, that generates power. The engine may be an internal combustion engine such as a compression ignition diesel engine, but in other embodiments, the engine may include a gas turbine engine. The power source is mounted on the frame 102 for providing propulsion power to the construction vehicle 100. More particularly, the power source is mounted within an enclosure 110 formed in the frame 102. Further, the frame 102 supports an undercarriage system 112. The undercarriage system 112 includes a pair of ground engaging members 114 each of which is embodied as a track in the illustrated embodiment of FIG. 1. The ground engaging members 114 rotate in order to propel the construction vehicle 100 on various ground surfaces. Alternatively, the ground engaging members 114 may include wheels instead of the tracks.

Figure 2:
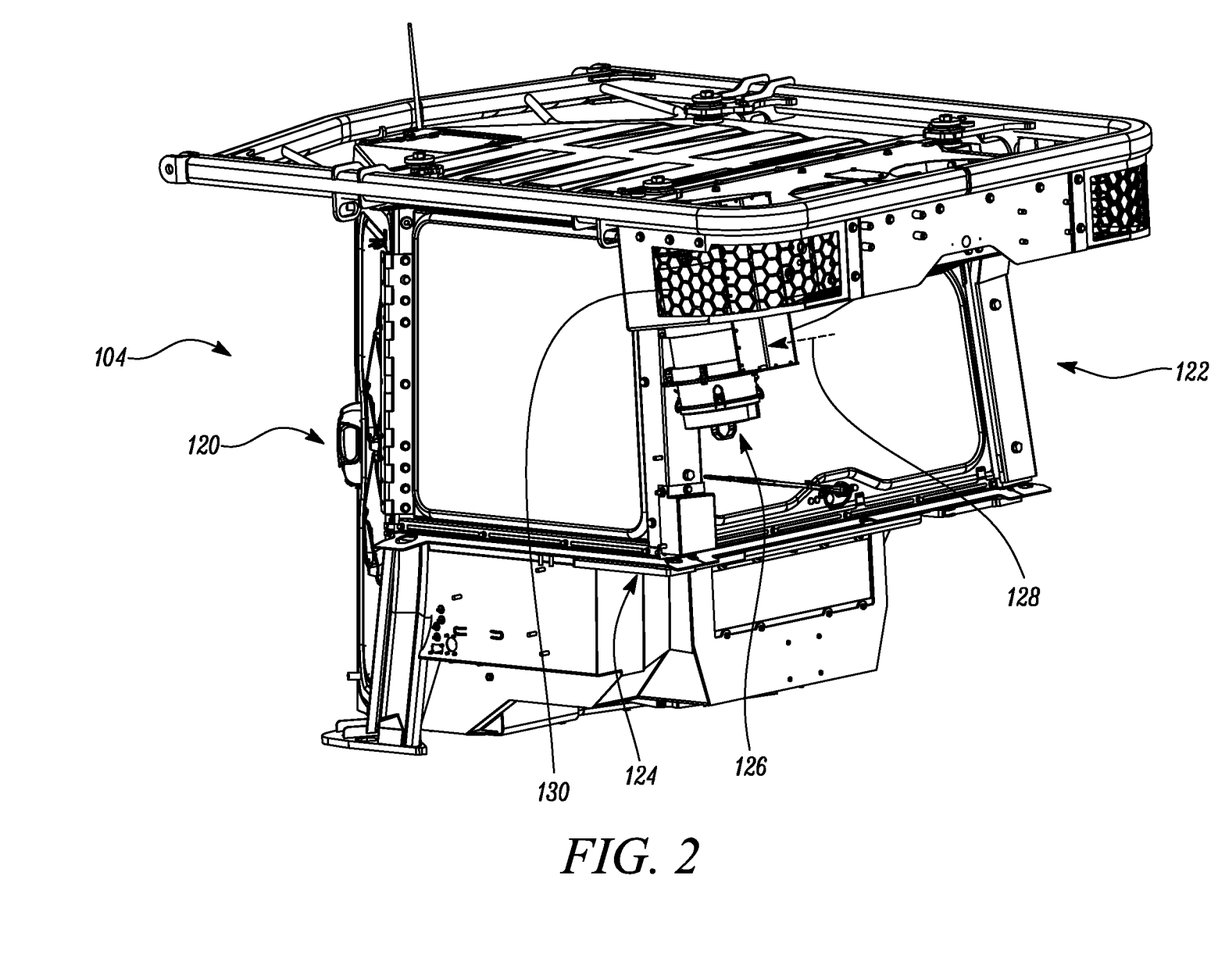
FIG. 2 is a perspective view of an operator cabin of the construction vehicle of FIG. 1, in accordance with an embodiment of the present disclosure.

Referring to FIG. 2, the operator cabin 104 defines a front end 120 and a rear end 122. The operator cabin 104 defines a frame portion 124. Further, the construction vehicle 100 includes an air filter assembly 126 coupled proximate the operator cabin 104. The air filter assembly 126 is coupled proximate the rear end 122 of the operator cabin 104. More particularly, the air filter assembly 126 is positioned proximate a top left corner defined at the rear end 122 of the operator cabin 104. However, a location of the air filter assembly 126 may vary, for example, the air filter assembly 126 may be positioned proximate the front end 120 of the operator cabin 104, without any limitations, such that the air filter assembly 126 does not impede operator visibility. It should be noted that the air filter assembly 126 may be positioned at various locations such that the air filter assembly 126 does not impede operator visibility.

In the illustrated example, the air filter assembly 126 is associated with an air treatment system (not shown) of the construction vehicle 100. The air treatment system may embody a Heating, Ventilation, and Air conditioning (HVAC) system. Accordingly, the air filter assembly 126 may filter an air stream 128 passing therethrough to remove any airborne molecular contaminants, volatile organic compounds, debris, and other contaminants from the air stream 128. Further, the air filter assembly 126 is enclosed by a guard 130. The guard 130 is embodied as a mesh screen that restricts a contact of large sized foreign particles or debris with the air filter assembly 126.

Figure 3:
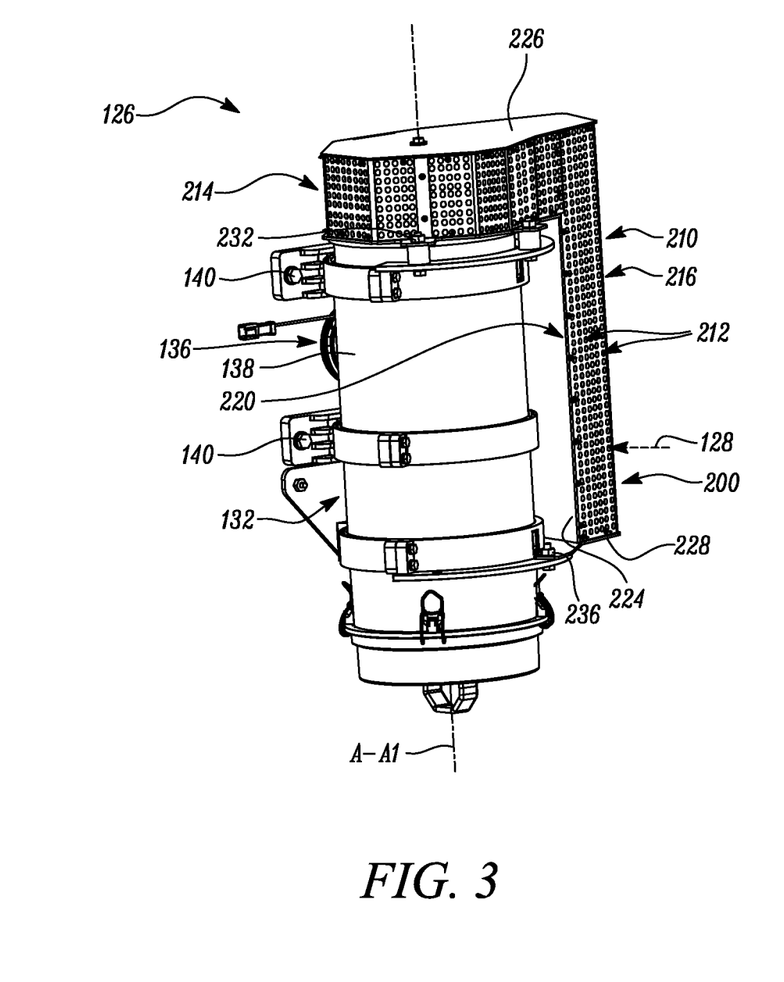
FIG. 3 is a perspective view of an air filter assembly coupled to the operator cabin of FIG. 2, in accordance with an embodiment of the present disclosure.

Referring to FIG. 3, the air filter assembly 126 includes an air filter 132 defining a central axis "A-A1". Further, the air filter 132 includes an inlet portion 134 (shown in FIG. 4). The air stream 128 enters the air filter 132 via the inlet portion 134. The air filter 132 also includes an outlet portion 136 that fluidly connects the air filter 132 with other components of the air treatment system present downstream of the air filter 132. The air filter 132 includes a housing 138. The housing 138 is embodied as a generally tubular member herein. The housing 138 encloses various components of the air filter 132 therein. The housing 138 defines a length "L1" (shown in FIG. 4) that extends along the central axis "A-A1". Further, the air filter 132 is coupled with the operator cabin 104 (see FIG. 2) using a number of first mechanical fasteners 140. More particularly, the housing 138 may define a number of through-apertures (not shown) that align with corresponding apertures (not shown) in the frame portion 124 (see FIG. 2) of the operator cabin 104 for receiving the number of first mechanical fasteners 140.

Figure 4:
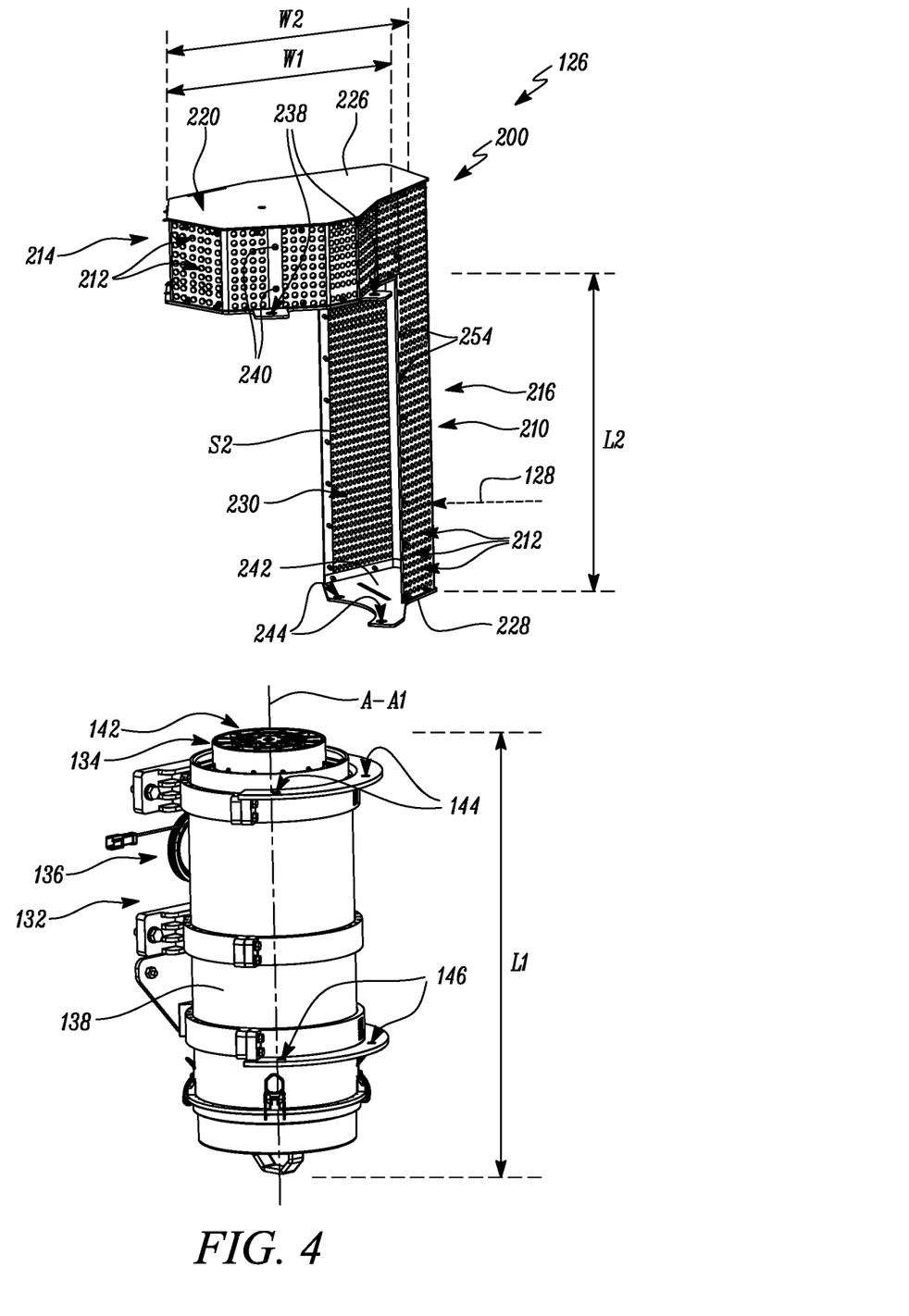
FIG. 4 is an exploded view of the air filter assembly of FIG. 3.

The air filter 132 also includes a pressurizer fan 142 (shown in FIG. 4). The pressurizer fan 142 is positioned in the housing 138 proximate the inlet portion 134 for drawing in the air stream 128. Further, the air filter 132 includes a filtering element (not shown) disposed in the housing 138. The filtering element filters any undesired contaminants/impurities from the air stream 128 entering the air filter 132. In some examples, the filtering element may include a cotton-based filtering element, without any limitations. The contaminants/impurities in the air stream 128 are entrapped in the air filter 132. Further, a clean air stream (not shown) exiting the air filter 132, via the outlet portion 136, may then be treated by components of the air treatment system present downstream of the air filter 132 before being directed to the operator cabin 104. It should be noted that components and a design of the air filter 132 described herein is exemplary in nature and the air filter 132 may include any design or combination of components generally known in the art, without limiting the scope of the present disclosure.

Referring to FIGS. 3 and 4, the air filter assembly 126 includes a screen assembly 200 removably coupled to the air filter 132 of the construction vehicle 100. The screen assembly 200 and the air filter 132 are positioned proximate the rear end 122 (see FIG. 2) of the operator cabin 104 (see FIG. 2) of the construction vehicle 100. The screen assembly 200 includes a substantially L-shaped structure. The screen assembly 200 includes a frame member 220 including a first portion 222 (shown in FIG. 5) and a second portion 224. The frame member 220 allows removable coupling of the screen assembly 200 with the air filter 132. More particularly, the frame member 220 of the screen assembly 200 is removably coupled to the housing 138 of the air filter 132. In the illustrated example, the frame member 220 is removably coupled to the housing 138 of the air filter 132 by a number of mechanical fasteners 232, 236 (shown in FIG. 3). The mechanical fasteners 232, 236 may be hereinafter interchangeably referred to as the second mechanical fasteners 232, 236. The second mechanical fasteners 232, 236 are embodied as bolts herein. Alternatively, the second mechanical fasteners 232, 236 may include a screw, a rivet, a pin, and the like. Further, other fastening techniques may be used to couple the screen assembly 200 to the housing 138 of the air filter 132. The frame member 220 may be made of a metal, such as stainless steel.

Figure 5:
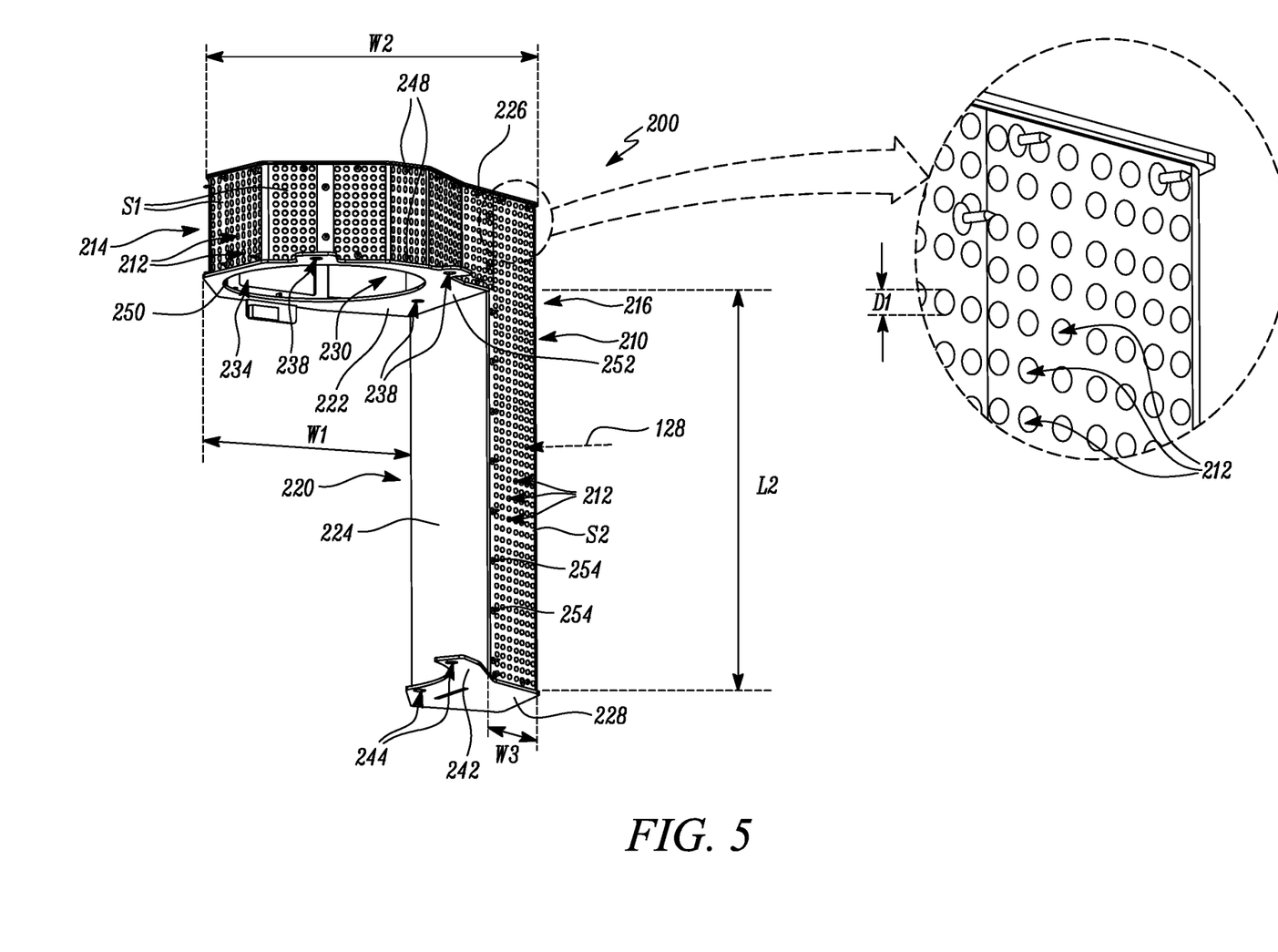
FIG. 5 is a perspective view of a screen assembly of the air filter assembly of FIG. 3, in accordance with an embodiment of the present disclosure.

As shown in FIG. 5, the first portion 222 defines a first width "W1". Further, the first portion 222 includes a first region 250 and a second region 252 disposed adjacent to the first region 250. The first region 250 is substantially circular in shape. The first region 250 defines an opening 234. The screen assembly 200 is coupled to the air filter 132 (see FIGS. 3 and 4) such that the first portion 222 of the frame member 220 is disposed proximate the inlet portion 134 (see FIG. 4) of the air filter 132. More particularly, the first portion 222 defines the opening 234 that provides fluid communication between the inlet portion 134 of the air filter 132 and a hollow space 230 of the screen assembly 200. The opening 234 is circular in shape.

Further, the second region 252 is substantially trapezoidal in shape. Alternatively, the second region 252 may have any other shape such as, but not limited to, rectangle or square, without any limitations. The first portion 222 defines a number of first through-holes 238 that align with a corresponding through-hole 144 (shown in FIG. 4) in the housing 138 (see FIGS. 3 and 4) for receiving the second mechanical fasteners 232 (see FIG. 3). As illustrated, the first through-holes 238 are defined in the first region 250 and the second region 252 for receiving the mechanical fasteners 232. Thus, the second mechanical fasteners 232 couple the first region 250 as well as the second region 252 with the housing 138 of the air filter 132.

Further, the second portion 224 is substantially perpendicular to the first portion 222 and substantially parallel to the central axis "A-A1" (see FIG. 3) defined by the air filter 132. The first portion 222 and the second portion 224 are arranged in an L-shaped configuration. Further, the second portion 224 extends along the housing 138 of the air filter 132. In some examples, a length "L2" of the second portion 224 is more than half of the length "L1" (see FIG. 4) of the housing 138. Further, a plate member 242 extends perpendicular to the second portion 224. The plate member 242 defines a number of second through-holes 244 that align with a corresponding through-hole 146 (shown in FIG. 4) in the housing 138 for receiving the second mechanical fasteners 236 (see FIG. 3).

As illustrated, the frame member 220 includes a third portion 226 that is substantially parallel to the first portion 222. Moreover, the frame member 220 includes a fourth portion 228 that is substantially perpendicular to the second portion 224 and substantially parallel to the third portion 226. The fourth portion 228 is generally trapezoidal in shape. Alternatively, the fourth portion 228 may be rectangular in shape. Further, a second width "W2" of the third portion 226 is approximately equal to a combination of the first width "W1" of the first portion 222 and a third width "W3" of the fourth portion 228.

The screen assembly 200 also includes a screen member 210. The screen member 210 is coupled to the frame member 220 such that the hollow space 230 is defined by the screen member 210 and the frame member 220. The screen member 210 of the present disclosure includes a first section 214, hereinafter interchangeably referred to as the section 214, and a second section 216 which are substantially perpendicular to each other. The first and second sections 214, 216 are further divided into multiple sub-sections "S1", "S2". It should be noted that each sub-section "S1", "S2" of the corresponding first and second sections 214, 216 may be substantially rectangular in shape. In some examples, the first section 214 may be folded so as to define the multiple sub-sections "S1". Alternatively, the first section 214 may include one or more multiple sub-sections "S1" that are coupled to each other using one or more fasteners 240. Moreover, the second section 216 may be folded so as to define the multiple sub-sections "S2". In alternate embodiments, the screen member 210 may include a single piece design.

Further, the section 214 of the screen member 210 extends between the first portion 222 and the third portion 226. More particularly, the first section 214 is coupled to the first portion 222 and the third portion 226 using a number of third mechanical fasteners 248. Moreover, the second section 216 is coupled to the second portion 224 and the fourth portion 228 using a number of fourth mechanical fasteners 254. The third and fourth mechanical fasteners 248, 254 may include any one of a bolt, screw, pin, rivet, and the like. In other examples, other coupling techniques, such as welding, soldering, or brazing may be used to couple the screen member 210 with the frame member 220.

Further, the screen member 210 includes a number of perforations 212 to allow passage of air therethrough. More particularly, the perforations 212 allow the air stream 128 to pass therethrough. Further, the number of perforations 212 restrict an ingress of debris into the hollow space 230 of the screen assembly 200. For example, the perforations 212 may restrict any debris that is present in the air stream 128 to enter the hollow space 230. The debris includes ember or wood particles, without any limitations. The term "ember" as used herein may refer to pieces of burnt wood/coal that may be present in the air stream 128. In some embodiments, each of the number of perforations 212 have a diameter "D1" in a range of about 0.5 millimeter (mm) to about 2 mm. In one specific embodiment, the diameter "D1" of each perforation 212 is approximately equal to 1 mm. It should be noted that the diameter "D1" is chosen such that the perforations 212 may restrict the ingress of debris, particularly ember, and allow unobstructed passage of the air stream 128 therethrough. It should be noted that the debris may include any particle that has a diameter greater than the diameter "D1" of the perforations 212. In some embodiments, the screen member 210 is made of stainless steel. In particular, the first and second sections 214, 216 may include a perforated sheet made from stainless steel.

During implementation, the screen member 210 of the screen assembly 200 allows the air stream 128 to enter within the hollow space 230 of the screen assembly 200. The air stream 128 then moves within the hollow space 230 and is directed towards the inlet portion 134 of the air filter 132. The air filter 132 filters the air stream 128 that exits the air filter 132 via the outlet portion 136 (see FIGS. 3 and 4).

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the screen assembly 200 removably coupled to the air filter 132 of the construction vehicle 100. The screen assembly 200 includes a modular design which may allow coupling of the screen assembly 200 with different types of air filters. The present disclosure allows removable coupling of the screen assembly 200 with different types of air filters thereby providing the benefit of retrofitting the screen assembly 200 with different types of air filters. Further, the screen assembly 200 may be easily disassembled from the air filter 132 during a maintenance schedule or replacement of the air filter 132.

The screen assembly 200 includes a compact design that can be easily accommodated and coupled around the air filter 132. The screen assembly 200 is used to restrict entry of debris, such as ember, wood particles, and the like, into the air filter 132, thereby preventing any damage to the air filter 132. The screen assembly 200 of the present disclosure includes a simple and cost-effective design that restricts the ingress of debris while allowing sufficient and uninterrupted supply of air to the air filter 132. The screen assembly 200 provides a large surface area for air to enter the screen assembly 200 in a compact footprint. As the design of the screen assembly 200 ensures sufficient air supply to the air filter 132 by meeting a minimum open area requirement, the screen assembly 200 does not affect a performance of the air treatment system. Further, the screen assembly 200 may reduce a downtime associated with the construction vehicle 100 by reducing a possibility of damage to the air filter 132 due to ember or other such debris.

The screen assembly 200 is substantially L-shaped and conforms with a shape of the housing 138 of the air filter 132. Such a design of the screen assembly 200 ensures adequate supply of the air stream 128 towards the air filter 132. In some embodiments, the third and fourth portions 226, 228 of the frame member 220 may form a part of the screen member 210 to allow increased quantity of air supply towards the air filter 132.

The screen assembly 200 and the air filter 132 are positioned proximate the rear end 122 of the operator cabin 104 of the construction vehicle 100 such that the screen assembly 200 does not impede operator visibility. Further, the second portion 224 of the frame member 220 and the second section 216 of the screen assembly 200 include a tapered design, such that the screen assembly 200 does not lie in a line of sight of the operator. The frame member 220 of the present disclosure includes multiple portions such as the first portion 222, the second portion 224, the third portion 226, and the fourth portion 228. Such a design of the frame member 220 may allow ease of manufacturing, assembly, and implementation of the frame member 220 to suit different types of air filters.

Further, the screen member 210 of the present disclosure allows pre-filtration of any debris (such as embers, wood particles, and the like). The screen member 210 includes the first and second sections 214, 216 which may allow ease of assembly and/or disassembly of the first and/or second sections 214, 216. Such a design may further allow customization and retrofitting of the screen assembly 200 with different types of air filters. The first section 214 and the second section 216 is further divided into multiple sub-sections "S1", "S2" to suit different operational and assembly considerations. The screen member 210 includes the number of perforations 212. The perforations 212 allow passage of air therethrough. Further, the perforations 212 restrict the ingress of debris, such as ember, that may otherwise hamper an operation of the air filter 132.

While aspects of the present disclosure have been particularly shown and described with reference to the embodiments above, it will be understood by those skilled in the art that various additional embodiments may be contemplated by the modification of the disclosed construction vehicles, systems, methods and processes without departing from the spirit and scope of what is disclosed. Such embodiments should be understood to fall within the scope of the present disclosure as determined based upon the claims and any equivalents thereof.

What is claimed is:

1. A screen assembly adapted to be removably coupled to an air filter of a construction vehicle, the screen assembly comprising:
    an L-shaped frame member including a first portion and a second portion; and
    an L-shaped screen member coupled to the L-shaped frame member such that a hollow space is defined by the L-shaped screen member and the L-shaped frame member,
    wherein the L-shaped screen member includes a plurality of perforations adapted to allow passage of air therethrough, and
    wherein the plurality of perforations are further adapted to restrict an ingress of debris into the hollow space of the screen assembly.

2. The screen assembly of claim 1, wherein the screen assembly is adapted to be coupled to the air filter such that:
    the first portion is disposed proximate an inlet portion of the air filter, and
    the second portion extends along an axis of the air filter.

3. The screen assembly of claim 2, wherein the first portion defines an opening that provides fluid communication between the inlet portion of the air filter and the hollow space of the screen assembly.

4. The screen assembly of claim 1, wherein the second portion is substantially perpendicular to the first portion.

5. The screen assembly of claim 1, wherein the L-shaped frame member further includes a third portion and a fourth portion that are substantially parallel to the first portion,
    wherein the L-shaped screen member includes a first section and a second section,
    wherein the first section extends along the first portion between the first portion and the third portion, and
    wherein the second section extends along the second portion between the third portion and the fourth portion.

6. The screen assembly of claim 1, wherein the L-shaped frame member is adapted to be removably coupled to a housing of the air filter by a plurality of mechanical fasteners.

7. The screen assembly of claim 1, wherein the L-shaped screen member comprises stainless steel.

8. The screen assembly of claim 1, wherein each of the plurality of perforations have a diameter in a range of about 0.5 millimeter (mm) to about 2 mm.

9. The screen assembly of claim 5, wherein the fourth portion is substantially trapezoidal in shape.

10. The screen assembly of claim 5, wherein the second section has a tapered design.

11. A construction vehicle comprising:
    a frame;
    an operator cabin supported by the frame; and
    an air filter assembly adapted to be coupled proximate the operator cabin, the air filter assembly including:
        an air filter defining a central axis, wherein the air filter includes an inlet portion; and
        a screen assembly removably coupled to the air filter, the screen assembly including:
            an L-shaped frame member including a first portion and a second portion; and
            an L-shaped screen member coupled to the L-shaped frame member such that a hollow space is defined by the L-shaped screen member and the L-shaped frame member,
            wherein the L-shaped screen member includes a plurality of perforations adapted to allow passage of air therethrough, and
            wherein the plurality of perforations are further adapted to restrict an ingress of debris into the hollow space of the screen assembly.

12. The construction vehicle of claim 11, wherein the screen assembly is removably coupled to the air filter such that:
    the first portion is disposed proximate the inlet portion of the air filter, and
    the second portion extends along the central axis of the air filter.

13. The construction vehicle of claim 12, wherein the first portion defines an opening that provides fluid communication between the inlet portion of the air filter and the hollow space of the screen assembly.

14. The construction vehicle of claim 11, wherein the second portion is substantially perpendicular to the first portion and substantially parallel to the central axis defined by the air filter.

15. The construction vehicle of claim 11,
wherein the L-shaped screen member includes a first section and a second section;
wherein the first section extends along the first portion; and
wherein the second section extends along the second portion.

16. The construction vehicle of claim 11, wherein the L-shaped frame member is removably coupled to a housing of the air filter by a plurality of mechanical fasteners.

17. The construction vehicle of claim 11, wherein the L-shaped screen member comprises stainless steel.

18. The construction vehicle of claim 11, wherein each of the plurality of perforations have a diameter in a range of about 0.5 mm to about 2 mm.

19. The construction vehicle of claim 11, wherein the air filter assembly is positioned proximate a rear end of the operator cabin of the construction vehicle.

20. The construction vehicle of claim 15, wherein the second section has a tapered design.

* * * * *